United States Patent [19]
Ribic et al.

[11] Patent Number: 5,743,687
[45] Date of Patent: Apr. 28, 1998

[54] FOURTH AXIS FIXTURE QUICK CHANGE

[76] Inventors: John Ribic, 7523 Allerton Ct., Hudson, Ohio 44236; Valentin Ribic, 24061 Pleasant Tr., Richmond Hts., Ohio 44143

[21] Appl. No.: 380,496

[22] Filed: Jan. 30, 1995

[51] Int. Cl.$^6$ .................................................. B23Q 3/06
[52] U.S. Cl. ........................ 409/225; 269/32; 269/309; 279/4.07; 279/4.04; 409/233
[58] Field of Search .................. 269/20, 32, 309; 279/4.01, 4.04, 4.06–4.09; 409/219, 221, 225, 233; 29/33 P, 563

[56] References Cited

U.S. PATENT DOCUMENTS

| 3,521,894 | 7/1970 | Haviland et al. | 279/4.04 |
| 3,914,853 | 10/1975 | Jauch | 29/563 |
| 4,174,828 | 11/1979 | Bergman | 269/20 |
| 4,260,307 | 4/1981 | Mickelsson et al. | 409/225 |
| 4,647,051 | 3/1987 | Stone et al. | 279/143 |
| 4,662,043 | 5/1987 | Stone et al. | 29/33 P |
| 5,487,539 | 1/1996 | Obrist | 269/309 |

FOREIGN PATENT DOCUMENTS

| 274932 | 7/1988 | European Pat. Off. | 409/233 |

*Primary Examiner*—Steven C. Bishop
*Attorney, Agent, or Firm*—Richard C. Litman

[57] ABSTRACT

A quick fixture changing apparatus for the fourth axis turn table of a machine tool. A pneumatic servomechanism exerts force on a drawbar, which is releasably attached to the fixture plate. The drawbar passes through the central opening of the turn table, so that the servomechanism, drawbar, and fixture are all axially aligned. An intermediate fixture plate is permanently mounted to the turn table, and has dowels for aligning the work holding fixture plate. When pneumatic pressure is relaxed, the fixture plate is manually lifted from the fourth axis. Tedious threading of fixture plates is eliminated. A new fixture plate, which has been prepared during the prior machining operation, can then be mounted on the dowels. Air pressure is restored, and the new fixture is securely locked in place. With 80 psi (5.5 kPa) operating pressure, a servomechanism of 6 inch (15 cm) diameter can develop a clamping force of 1800 lb (800 N). Displacement under the forces of machining is successfully resisted by the clamping force in combination with alignment dowels. A manual valve controls pneumatic pressure for both clamping and relaxing. A rotary joint enables the pneumatic supply to remain connected to the servomechanism. In one embodiment, the piston of the servomechanism is directly attached to the drawbar. In an alternative embodiment, a wedge moved by the servomechanism occupies a slot formed in the drawbar. This arrangement defeats potential compression of the air within the servomechanism. The novel clamp requires ordinary compressed air apparatus, and provides significant savings in labor time.

17 Claims, 4 Drawing Sheets

FOURTH AXIS FIXTURE QUICK CHANGE

BACKGROUND OF THE INVENTION

1. Field of the Invention

The present invention relates to a pneumatic, rotatable clamp which enables a work holder to secure a fixture and workpiece to a machine tool equipped with a rotating work holding turn table. The clamp enables rapid setup and release of the fixture and work piece when the work piece is to be machined while attached to the turn table. The novel clamp renders bolting methods previously employed for this purpose obsolete.

2. Description of the Prior Art

Work holders for machine tools are well known, generally being designed to provide sufficient clamping force so that the cutting element will not displace the workpiece. Those work holders intended to be mounted to a turntable of a machine tool are screw operated. Hydraulically operated work holders employed in stationary operation are also known.

A hydraulic clamp is shown in U.S. Pat. No. 4,909,493, issued to Keitaro Yonezawa on Mar. 20, 1990. As shown in the depiction of FIG. 8 of this patent, the hydraulic clamp urges a rolling bar against a rotating pulley. A special joint accommodating rotation enables connection of a flexible hose, which does not rotate, to the rotating pulley. The present invention is not dependent upon a rotating joint, and dispenses with connection to a supply of pressurized fluid during operation. It should be noted that the device of Yonezawa occupies a substantial volume within the hub of the subject hydraulic clamp, and lacks a draw bar.

A hydraulically operated clamp for securing a fixture on a machine tool is seen in U.S. Pat. No. 4,688,974, issued to Larry E. Wright et al. on Aug. 25, 1987. The hydraulic clamp secures the fixture to a stationary surface, and is itself stationary.

Further examples of devices for holding workpiece holders in place on machine tools are seen in U.S. Pat. No. 4,647,051, issued to William S. Stone et al. on Mar. 3, 1987, and EPO Pat. Publication No. 0,201,298, dated Nov. 12, 1986. Neither of the latter two examples relies upon fluid pressure to develop clamping force.

These prior art inventions fail to teach a pneumatic clamp, a clamp which is easily installed in a fourth axis turn table of a machine tool, and releasing of a fixture by an operation comprising a single step requiring but one quick manual motion by the operator.

None of the above inventions and patents, taken either singly or in combination, is seen to describe the instant invention as claimed.

SUMMARY OF THE INVENTION

In machining work, savings in labor time will yield economic savings. In particular, securing a workpiece within a machine tool becomes a significantly time absorbing task when many parts are to be machined. Considerable time savings could be realized by reducing time devoted to this phase of the work. The value of quick changing of fixtures is attested to by the aforementioned Wright et al. patent. Decreasing labor and time required to replace fixtures could be accomplished by deleting tedious operations required to tighten threaded fasteners.

It would be preferable to rely upon fluid pressure, but prior to the present invention, no design has been set forth which is fastened to the turn table of a machine tool, and which can be readily and cleanly operated, in the sense that it is unencumbered by a messy hydraulic connection.

The present invention is particularly directed to those turn tables known within the industry as the "fourth axis". Such turn tables typically mount to the working bed of the machine tool and enable a part to be positioned as desired beneath a cutting blade. The turn table can either rotate the part during machining, or hold the part at a desired degree of rotation in a constant position.

The apparatus of the novel clamp comprises a fixture which is located on the turn table in the usual position, and a pneumatic servomechanism which exerts a pulling force on the fixture. A draw bar passes through the turn table, and attaches to the servomechanism. Thus, the novel apparatus forms a sandwich surrounding and cooperating with the conventional turn table, and remains independent of the chassis of the machine tool. A flexible air hose connected to a suitable supply of compressed air enables the novel clamp to operate. A three way valve pressurizes and depressurizes the servomechanism.

The grasp of the fixture on the turn table is quickly established by pressurizing or releasing pressure from the servomechanism. Tedious threading is eliminated, and changing fixtures is successfully performed in less than one minute. Pressure is relaxed by moving a lever on the three way valve. The fixture holding the completed work is quickly removed, and a new fixture replaces it. The lever is moved, and air pressure secures the new fixture in place within seconds.

A constantly connected air hose supplies pneumatic pressure to the servomechanism. An ordinary pneumatic fitting provides a rotary joint at the point of connection, the joint being both durable and reliable at frequently encountered rotational speeds. The clamp is controlled by a single valve located in series within a pneumatic hose supplying pressure to the servomechanism.

In one embodiment of the invention, the servomechanism acts directly upon the drawbar. For applications requiring great clamping force, an indirect connection is provided wherein the servomechanism acts on a wedge which moves the drawbar. The advantage of the latter arrangement is that fluctuating forces arising from the cutting blade may tend to relax the grasp of the drawbar on the fixture. In the second embodiment, attempted relaxation of the drawbar will encounter resistance from the incompressible wedge. In the first embodiment, the forces would act on the piston of the servomechanism, which could then momentarily compress air therein. It would be possible in some circumstances that the fixture and workpiece move slightly, and lose precise location with respect to the cutting blade. This is the hazard which is overcome by the wedge arrangement.

When performing automated machining, the operator can manually load a new workpiece onto a new fixture while machining proceeds. When the current machining operation is complete, the operator merely removes and replaces a fixture.

The novel clamp is uncomplicated, durable, and highly practical. With ordinary pneumatic pressures, the invention develops high clamping forces, thereby securing the workpiece securely enough to resist displacement during machining. In employing a pneumatic medium, which is compressible, it becomes possible to maintain pressure without operating a motorized pump or other power consuming equipment while machining.

Accordingly, it is a principal object of the invention to provide a pneumatic clamp for securing a fixture plate to a turn table of a machine tool.

It is another object of the invention to reduce assembly time required to secure a fixture plate to the turn table.

It is a further object of the invention to release the fixture plate by a one step, one motion manual operation.

Still another object of the invention is to provide a pneumatic clamp which cooperates with a fourth axis turn table of a machine tool.

An additional object of the invention is to resist displacement of the workpiece on the machine tool.

It is again an object of the invention to employ a compressible pressurized medium, so that operation of a motorized pump during machining is eliminated.

Yet another object of the invention is to employ readily available pneumatic components to provide operating pressure.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
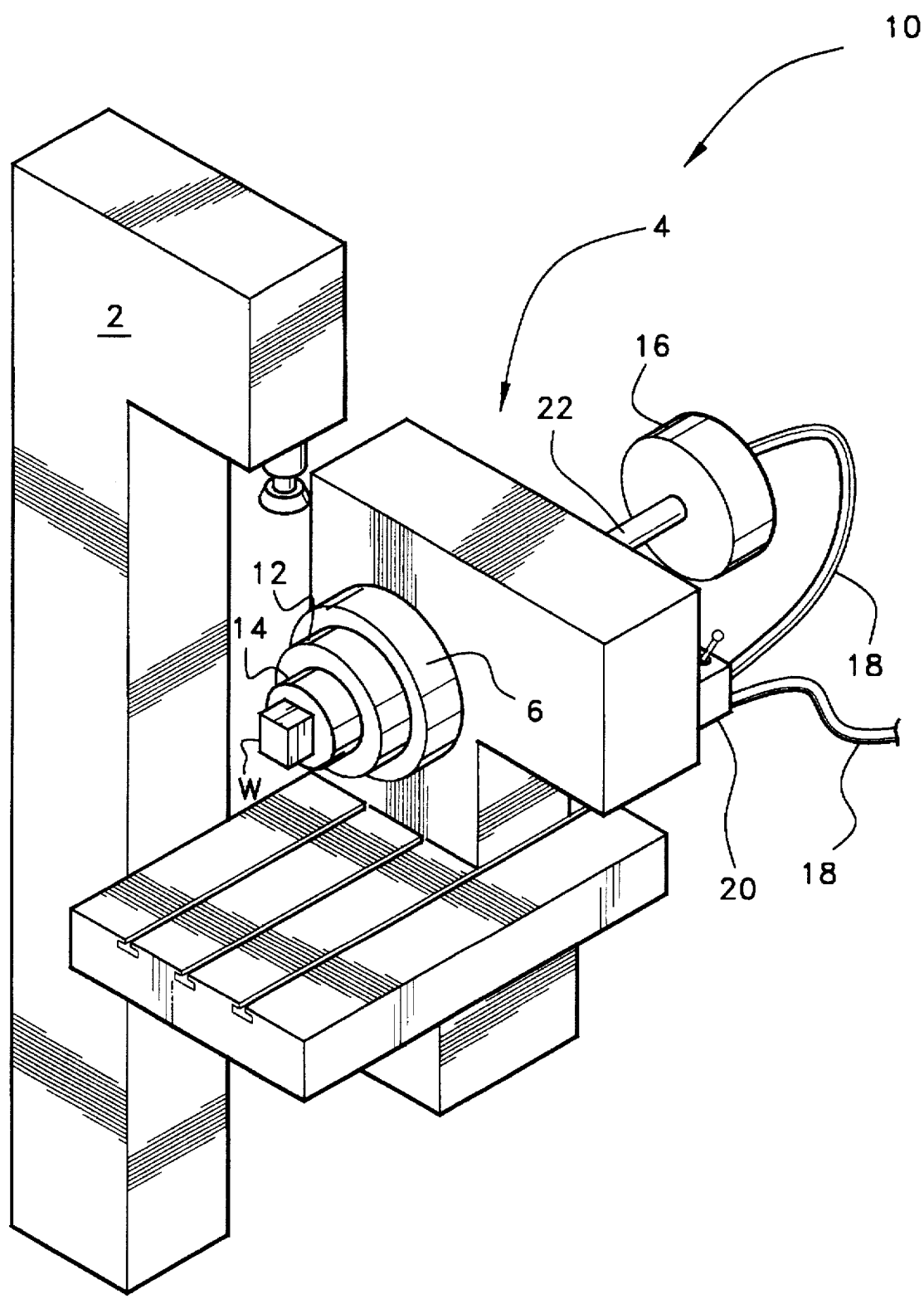
FIG. 1 is a diagrammatic, environmental, perspective view of the invention.

Turning now to FIG. 1 of the drawings, a typical vertical machining center 2 is shown, wherein a fourth axis turntable assembly 4 is in operation. The novel pneumatic clamp 10 is installed on turntable 4, with first and second fixture plates 12,14 shown fastened to a conventional face plate 6 of turntable 4. A workpiece W is shown fastened to fixture plate 14 for machining.

Plates 12,14 have flat, planar surfaces, and cooperate with one another and with face plate 6 to remain in mutual parallel orientation. Plate 12 has dowels 13 for aligning plate 14, which penetrate cooperating holes 15 formed in plate 14, as best shown in FIG. 2.

On the right side of fourth axis turntable 4, as shown in this view, is a pneumatic servomechanism 16, air conduits 18 conducting pressurized air thereto, and a three way valve 20 controlling passage of air into servomechanism 16. A tube 22 passes through turntable 4, and connects to both servomechanism 16 and to fixture plates 12,14.

Figure 2:
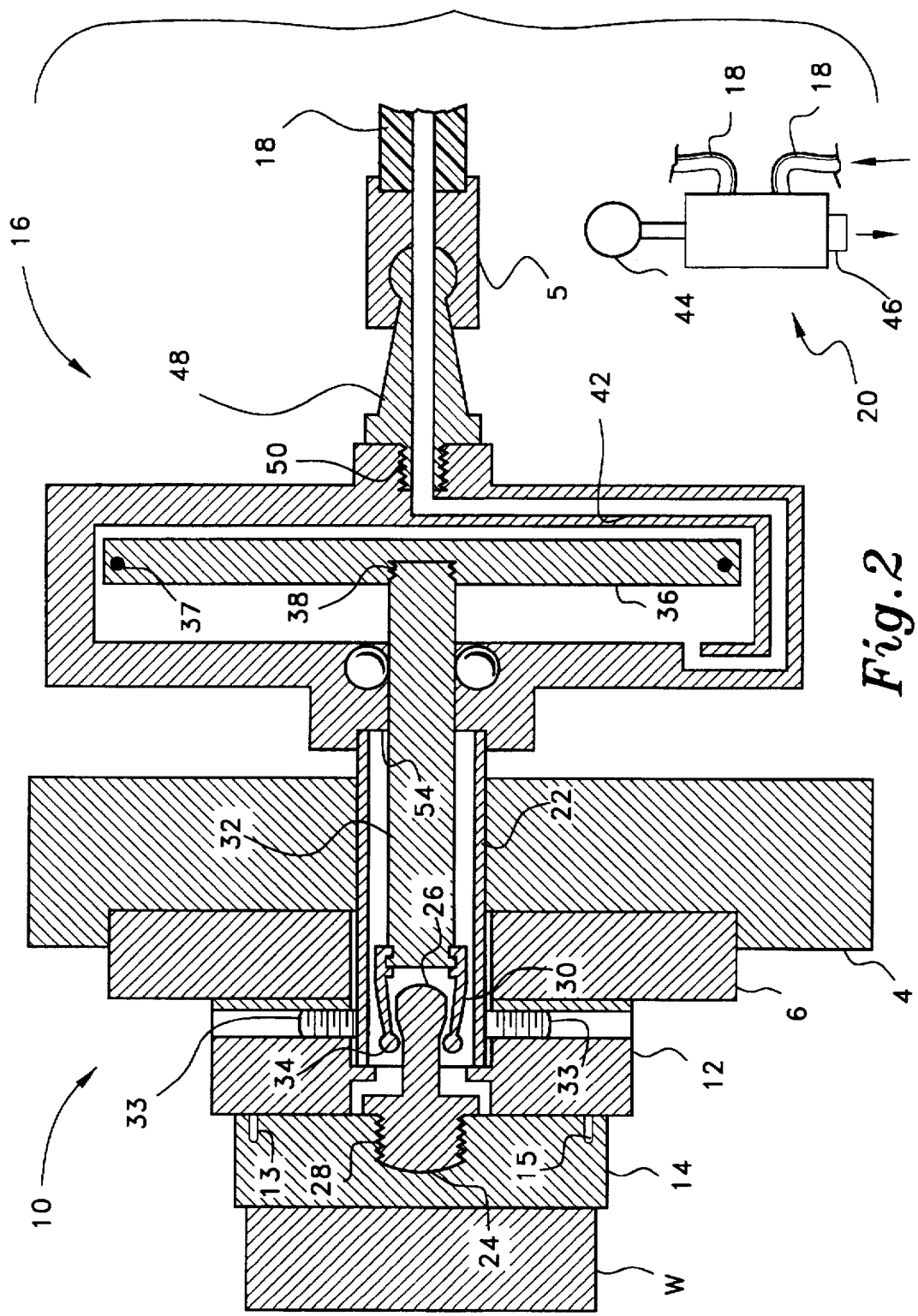
FIG. 2 is a diagrammatic, side cross sectional view of the invention, drawn to enlarged scale.

FIG. 2 shows the internal components of the novel clamp 10. In this view, certain conventional components for fastening fixture plates to turntable 4, and the workpiece to fixture plates, such as screws and their associated T-slots, are omitted for clarity. A conventional retention stud 24 having an enlarged head 26 is fastened to fixture plate 14 by threads 28. This stud 24 is engaged by jaws 30 which engage an elongated drawbar 32 for transmitting a pulling force. Jaws 30 have enlarged ends 34, and their operation will be described hereinafter. Drawbar 30 connects to a piston 36 of servomechanism 16 by threads 38, and is surrounded by tube 22 to achieve compactness and to take full advantage of the central hole formed in fourth axis assembly 4. Alignment of retention stud 24 and drawbar 32 result in compactness of the invention and in the location of servomechanism 16.

Tube 22 is secured to the housing of servomechanism 16 by friction fit at that end of tube 22. The other end of tube 22 is not permanently attached to a fixture so that it may be passed through the opening formed in turntable 4. To maintain fixtures in place on tube 22 when clamp 10 is assembled, two setscrews 33 are provided. With setscrews 33 arranged at an angle to one another, the combination of two setscrews 33 pins tube 22 stably within the central bore of plate 12. Setscrews 33 are slackened to disassemble clamp 10.

Servomechanism 16 includes a chamber 40 which is pressurized during operation. This pressure provides the pulling or clamping force clamping fixtures 12,14 to turntable 4. Compressed air enters chamber 40 through a passageway 42. Pressure urges piston 36 to the right, as seen in FIG. 2, so that plate 14 is drawn against plate 12 and face plate 6 under great pressure. Pressure is prevented from leaking to the other side of piston 36 by an O-ring 37. Given a piston diameter of six inches (15 cm) and air pressure of eighty pounds per square inch (5.5 kPA), a clamping force exceeding 1800 pounds (800 N) is developed. An eight inch (20 cm) piston will develop more than 3600 pounds (1600 N) of force with the same air pressure. This pressure is necessary to resist displacement of workpiece W as the cutter 8 (see FIG. 1) engages the same at a direction normal to the axis of rotation and to fasteners securing workpiece W to its fixture plate.

Pressurized air is taken from any suitable source, such as an air compressor (not shown). Air pressure enters valve 20, and, when handle 44 is moved into the appropriate position, pressure is able to flow into chamber 40. Pressure is released by moving handle 44 to another position. In the latter position, pressurized air is blocked, and air within chamber 40 is exhausted to the atmosphere as indicated at 46.

Figure 4:
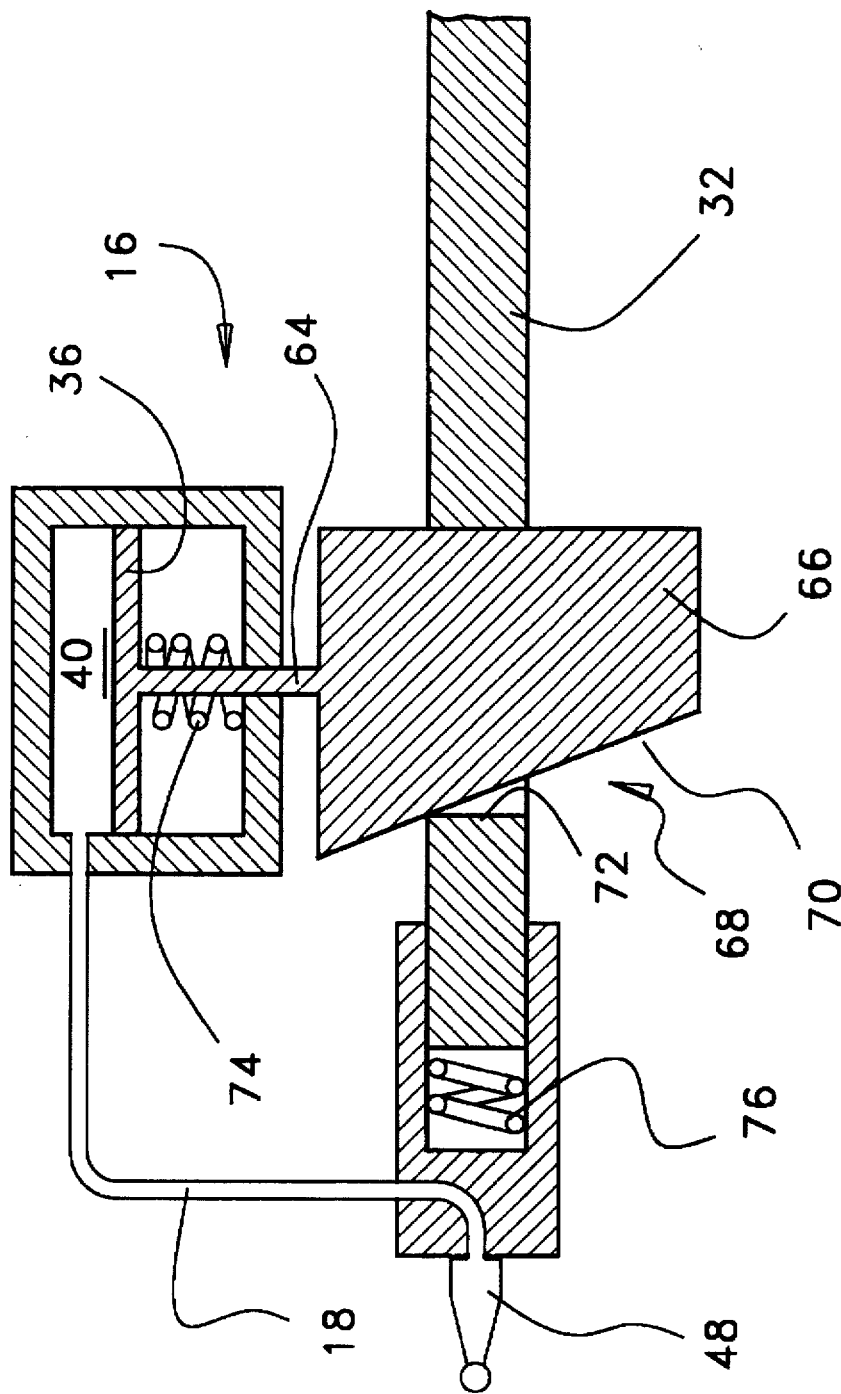
FIG. 4 is a diagrammatic, side cross sectional view of a second embodiment of the invention.

When air is exhausted, piston 36 returns to its original position under the influence of a return spring (shown in FIG. 4).

Pressurized air enters servomechanism 16 at a fitting 48. Fitting 48 is a conventional male air fitting, and threads to servomechanism at 50. Conduits 18 have terminals comprising conventional, manually attachable male and female fittings, and female fitting 52 engages male fitting 48. This creates a rotary joint, since mutual rotation between male and female fittings 48,52 is possible. Thus, conduits 18 are constantly connected to servomechanism 16 and remain in a fixed position, even during rotation for machining and for indexing.

When piston 36 exerts clamping force, this condition shown in FIG. 2, plate 12 is drawn tightly to servomechanism 16 by compressing tube 22 therebetween. Tube 22 provides a spacing member for this purpose, and abuts shoulder 54 of servomechanism 16, and also abuts shoulder 55 of plate 12. Shoulder 55 is formed by a flange or other member projecting inwardly towards the central opening formed in plate 12. Tube 22 and drawbar 32 pass entirely through the fourth axis assembly since these assemblies conventionally have a central opening. Fixture plates 12,14 are also provided with central openings to maintain communication afforded by the central opening of the fourth axis assembly.

Thus, fourth axis assembly 4 is rendered immune from clamping forces, and servomechanism 16 and fixture plates 12,14 are separated, so that servomechanism 16 can be located out of the way on the idle side of fourth axis assembly 4.

Figure 3:
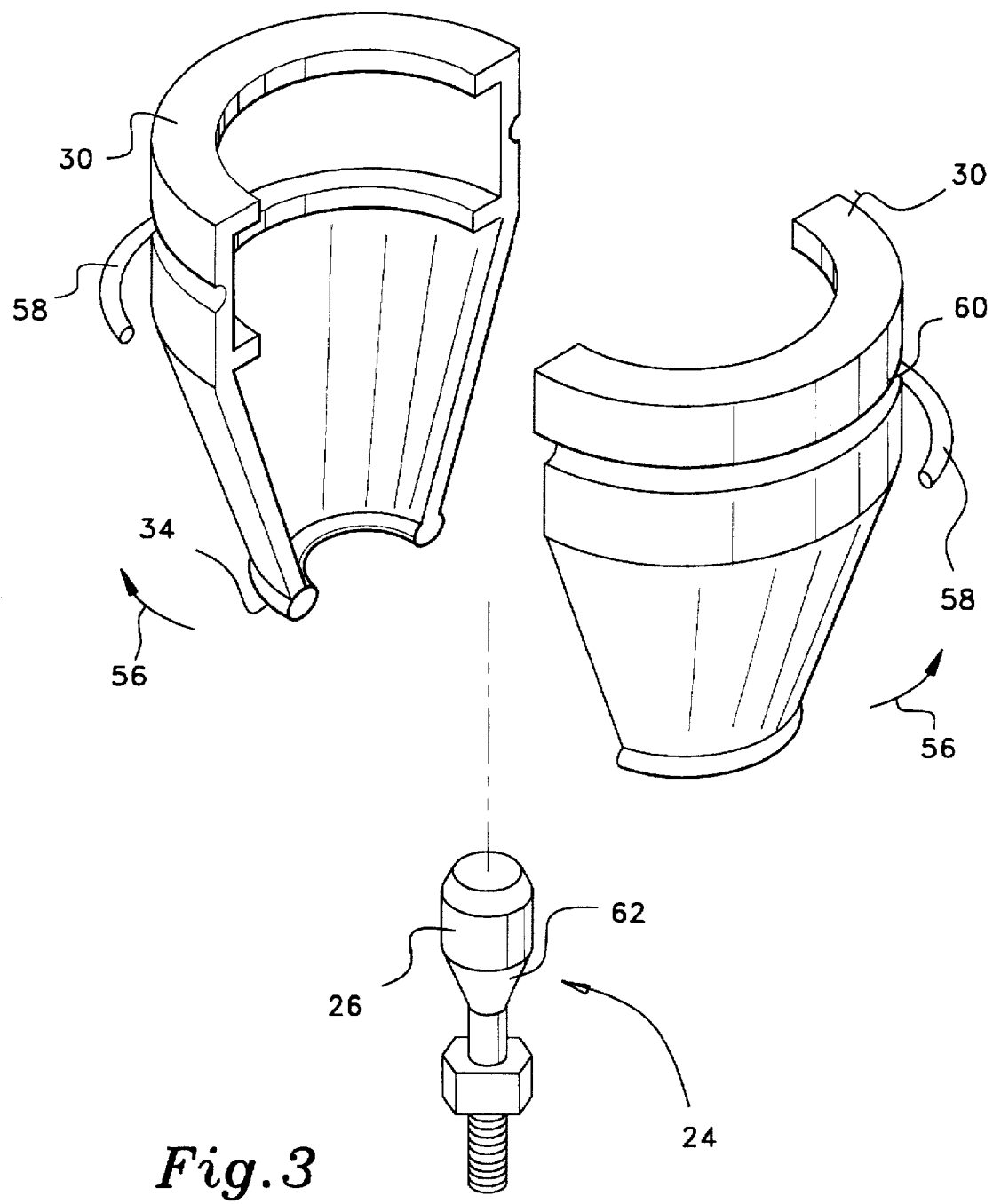
FIG. 3 is a perspective detail view of internal components of the invention.

Releasable engagement of drawbar 32 by jaws 30 is further explained with reference to FIG. 3. Although depicted as fitting tightly to drawbar 32 in FIG. 2, the actual fit is loose. This enables pivoting of jaws 30, as indicated by arrows 56 in FIG. 3. A resilient coil or spring 58 occupies a groove 60 formed in each jaw 30, so that jaws 30 are constantly urged to spread apart.

When piston 36 is in the unpressurized position, drawbar 32 moves under the influence of the return spring 74 (see FIG. 4) so that jaws 30 can spread apart. When this occurs, ends 34 of jaws 30 release their grip on the ramp 62 of enlarged head 26 of stud 24.

However, when pressure acts on piston 36, jaws 30 close over enlarged head 26. Thus, drawbar 32 releasably engages stud 24.

Increasing piston diameter will increase total clamping force, given constant operating air pressure. However, there will be circumstances in which it is desired to secure the installation of the workpiece not merely by increasing clamping force, but by another method. Since air is compressible, it is possible for an impulse or force acting on drawbar 32 to enable the workpiece to be released, even if momentarily. With reference to FIG. 4, a solid drawbar actuator is described.

With plates 12,14, jaws 30, and retention stud 24 being unchanged, servomechanism 16 is relocated out of axial alignment with drawbar 32, which remains in alignment with stud 24. In an alternative embodiment depicted in this view, piston 36, when subjected to pressure in the previously described way, acts through a rod 64 on a wedge 66. Wedge 66 moves at an angle to the motion of drawbar 32, occupying a longitudinal slot 68 formed in drawbar 32. The inclined surface 70 of wedge 66 bears on an end surface 72 of drawbar 32. Downward vertical motion of wedge 66, responsive to pressure filling chamber 40, as depicted in this view, moves drawbar to the left, placing clamping force on plates 12,14.

When pressure is released, return spring 74 returns piston 36 to its original position, so that operation cycles cause wedge 66 to reciprocate within slot 68, thus advancing and withdrawing drawbar 32. Return spring 76 urges drawbar 32 to release stud 24 (see FIG. 2). In this embodiment, a solid object obstructs longitudinal motion of drawbar 32, so that a force imposed on drawbar 32 cannot induce relaxation of clamping force.

Spring 74, although illustrated only in FIG. 4, is also provided in the embodiment of FIG. 2, having been omitted only for clarity. In the embodiment of FIG. 2, spring 74 urges piston 36 in a direction opposing that resulting from pressurization of chamber 40.

It is to be understood that the present invention is not limited to the embodiments described above, but encompasses any and all embodiments within the scope of the following claims.

We claim:

1. A pneumatic clamp assembly for securing a fixture to a turn table of a machine tool, said pneumatic clamp assembly comprising:

a first plate for holding a work piece, said first plate including means defining a hole and a stud centrally fastened thereto, said stud having an enlarged head;

a second plate adjacent said first plate and attachable to the turn table, said second plate having a central opening alignable with said stud, a dowel alignable with the hole of said first plate, and a projecting member disposed within said central opening;

an elongated drawbar alignable with said stud, said drawbar including a plurality of jaws pivotally disposed thereon and closable over said enlarged head of said stud, whereby said drawbar releasably engages said stud;

a pneumatic servomechanism attached to said drawbar and operably connected thereby to said first plate, whereby said first plate is releasably connectable to said servomechanism, and said first plate is clamped to said second plate when said servomechanism generates a pulling force; and a spacing member separating and abutting said servomechanism and said projecting member of said second plate.

2. The pneumatic clamp assembly according to claim 1, further comprising a conduit conducting pneumatic pressure to said servomechanism, and a valve disposed in series within said conduit, said valve selectively enabling pneumatic pressure to flow to said servomechanism and enabling pneumatic pressure to be released from said servomechanism.

3. The pneumatic clamp assembly according to claim 2, said conduit having a manually attachable terminal, and said servomechanism having a fitting disposed thereon manually connectable to said terminal of said conduit, said terminal of said conduit and said fitting combining to form a rotary joint, whereby said conduit is connected to said servomechanism while said fixture rotates, and said conduit remains in a fixed position.

4. The pneumatic clamp assembly according to claim 2, said valve being a three way valve controlling pneumatic pressure acting on said servomechanism, said three way valve selectively enabling pneumatic pressure to bear upon said servomechanism, maintaining pneumatic pressure bearing upon said servomechanism, and releasing pneumatic pressure from said servomechanism.

5. The pneumatic clamp assembly according to claim 1, said second plate having a first flat, planar surface for abutting the turn table, and a second flat, planar surface for cooperating with said first plate.

6. The pneumatic clamp assembly according to claim 1, said spacing member comprising a tube surrounding said drawbar.

7. The pneumatic clamp assembly according to claim 1, further comprising a solid drawbar actuator, wherein said drawbar includes means defining a longitudinal slot extending therethrough, said slot including an end surface, and said pneumatic clamp further comprises:

a wedge disposed within said drawbar slot, including an inclined surface bearing against said end surface of said slot, and operably connected to said servomechanism to reciprocate within said slot, and to advance and withdraw said drawbar thereby.

8. A pneumatic clamp for securing a fixture to the turn table of a machine tool, comprising:

a fixture attachable to the turn table, comprising a first plate for positioning in a parallel relationship to the turn table, and a stud having an enlarged head, and a second plate disposed between said first plate and the turn table, said second plate attached by threaded fastener to said turn table, and having a dowel projecting towards said first plate for alignment thereof, said first plate having means defining a cooperating hole enabling said alignment, said second plate further having means defining a hole providing a central opening for passing a drawbar through said second plate, and an inwardly projecting member disposed within said central opening;

an elongated drawbar for transmitting a pulling force acting on said fixture, said drawbar passing through the turn table and said central opening of said second plate, said drawbar alignable with said stud, and further including a plurality of jaws pivotally disposed thereon and closable thereover, whereby said drawbar releasably engages said stud;

a pneumatic servomechanism for generating a pulling force, said servomechanism attached to said drawbar and operably connected thereby to said fixture, whereby said fixture is releasably connectable to said servomechanism, and said fixture is clamped to the turn table when said servomechanism generates a pulling force and said drawbar engages said fixture and transmits the pulling force thereto; and a spacing member separating and abutting said servomechanism and said projecting member of said second plate, whereby clamping pressure generated by said servomechanism urges said first plate against said servomechanism and renders the turn table immune to clamping pressure.

9. The pneumatic clamp according to claim 8, said spacing member comprising a tube surrounding said drawbar.

10. The pneumatic clamp according to claim 8, said second plate having a first flat, planar surface for abutting the turn table, means defining tee slots for accepting threaded fasteners for fastening said first plate thereto, and a second flat, planar surface for cooperating with said first plate.

11. The pneumatic clamp according to claim 8, further comprising a conduit conducting pneumatic pressure to said servomechanism, said conduit having a manually attachable terminal, and said servomechanism having a fitting disposed thereon manually connectable to said terminal of said conduit, said terminal of said conduit and said fitting combining to form a rotary joint.

12. The pneumatic clamp according to claim 11, said conduit further comprising a three way valve disposed in series therewith, said valve selectively enabling pneumatic pressure to flow to said servomechanism and enabling pneumatic pressure to be released from said servomechanism.

13. The pneumatic clamp according to claim 11, further comprising a solid drawbar actuator, wherein said drawbar includes means defining a longitudinal slot extending therethrough, said slot including an end surface, and said pneumatic clamp further comprises:

a wedge disposed within said drawbar slot, including an inclined surface bearing against said end surface of said slot, and operably connected to said servomechanism to reciprocate within said slot, and to advance and withdraw said drawbar thereby.

14. A fourth axis turn table assembly for a machine tool, comprising:

a turn table having an axis of rotation, said turn table including means defining a throughbore disposed coaxially with said axis of rotation; and a pneumatic clamp including a fixture for securing a workpiece against said turn table, said pneumatic clamp generating a pulling force drawing said fixture against said turn table, said pneumatic clamp imposing the pulling force in a direction parallel to said axis of rotation, wherein said fixture comprises a first plate for holding a work piece, said first plate positioned in a parallel relationship to the turn table, and having a stud having an enlarged head, and said pneumatic clamp further comprises:

an elongated drawbar for transmitting a pulling force acting on said fixture, said drawbar passing through said central throughbore of said turn table, said drawbar alignable with said stud, and further including a plurality of jaws pivotally disposed thereon and closable over said enlarged head of said stud, whereby said drawbar releasably engages said stud; and a pneumatic servomechanism for generating a pulling force, said servomechanism attached to said drawbar and operably connected thereby to said fixture, whereby said fixture is releasably connectable to said servomechanism, and said fixture is clamped to said turn table when said servomechanism generates a pulling force and said drawbar engages said fixture and transmits the pulling force thereto;

a second plate disposed between said first plate and said turn table, said second plate attached by threaded fastener to said turn table, and having a dowel, means defining a central opening alignable with said drawbar, and an inwardly projecting member disposed within said central opening; and a spacing member separating and abutting said servomechanism and said projecting member of said second plate, whereby clamping pressure generated by said servomechanism urges said first plate against said servomechanism and renders said turn table immune to clamping pressure, said first plate further having means defining a hole alignable with said dowel.

15. The fourth axis turn table assembly according to claim 14, further comprising:

a conduit conducting pneumatic pressure to said servomechanism, having a manually attachable terminal, and said servomechanism having a fitting disposed thereon manually connectable to said terminal of said conduit, said terminal of said conduit and said fitting combining to form a rotary joint; and a valve disposed in series within said conduit, said valve selectively enabling pneumatic pressure to flow to said servomechanism and enabling pneumatic pressure to be released from said servomechanism.

16. The fourth axis turn table assembly according to claim 14, said second plate having a first flat, planar surface for abutting the turn table, means defining tee slots for accepting threaded fasteners for fastening said first plate thereto, and a second flat, planar surface for cooperating with said first plate.

17. The fourth axis turn table assembly according to claim 14, said pneumatic clamp further comprising a solid drawbar actuator, wherein said drawbar includes means defining a longitudinal slot extending therethrough, said slot including an end surface, and said pneumatic clamp further comprises:

a wedge disposed within said drawbar slot, including an inclined surface bearing against said end surface of said slot, and operably connected to said servomechanism to reciprocate within said slot, and to advance and withdraw said drawbar thereby.

\* \* \* \* \*